United States Patent [19]

Israeli

[11] 4,361,262
[45] Nov. 30, 1982

[54] METHOD OF MAKING EXPANDED SANDWICH STRUCTURES

[75] Inventor: Leonardo Israeli, Los Angeles, Calif.

[73] Assignee: Rockwell International Corporation, El Segundo, Calif.

[21] Appl. No.: 158,845

[22] Filed: Jun. 12, 1980

[51] Int. Cl.$^3$ ............................................ B23K 20/18
[52] U.S. Cl. .................................. 228/118; 228/157; 428/594; 156/197
[58] Field of Search .............. 228/118, 157, 155, 265; 29/155 R, 157.3 V; 428/594, 604, 116, 119; 156/197

[56] References Cited

U.S. PATENT DOCUMENTS

| | | | |
|---|---|---|---|
| 3,111,747 | 11/1963 | Johnson | 29/157.3 V |
| 3,413,765 | 12/1968 | Williams et al. | 156/197 X |
| 3,927,817 | 12/1975 | Hamilton et al. | 228/157 |
| 4,217,397 | 12/1980 | Hayase et al. | 228/157 |
| 4,292,375 | 9/1981 | Ko | 228/157 X |

*Primary Examiner*—Kenneth J. Ramsey
*Attorney, Agent, or Firm*—Charles T. Silberberg

[57] ABSTRACT

A method of making sandwich structures from a plurality of workpieces is disclosed. The method comprises providing a plurality of workpieces, each having principal opposed surfaces. The workpieces comprise first and second outer workpieces and at least two core workpieces. Each of the core workpieces have cutout portions defining at least one strip. The workpieces are treated at selected locations to inhibit joining at said locations. The treated workpieces are positioned in a stack contacting at their principal surfaces. The workpieces are joined, preferably by diffusion bonding, at their untreated contacting surfaces such that alternate longitudinal edges of superimposed strips are joined together and to the outer workpieces. Preferably, at least one chamber is enclosed by positioning the stacked workpieces relative to a plurality of shaping members. At least one of the outer workpieces is caused to expand into the at least one chamber and to form against the at least one shaping member causing the strips of the core workpieces to extend substantially vertically. If an even number of core assemblies are used the webs are vertical; and if an odd number are used they are at an angle to the cover workpieces. Preferably, the at least one expanded outer workpieces has an effective strain rate sensitivity and the expansion is accomplished superplastically.

11 Claims, 5 Drawing Figures

METHOD OF MAKING EXPANDED SANDWICH STRUCTURES

BACKGROUND OF THE INVENTION

1. Field of Invention

The invention relates to the field of metal and non metal forming, and particularly to an improvement to the method of making sandwich structures by a combination of selective joining and, accordion expansion.

2. Description of Prior Art

It has been known for many years that certain metals, such as titanium, and other alloys, exhibit superplasticity. Superplasticity is the capability of a material to develop unusually high tensile elongations with a reduced tendency toward necking. This capability is exhibited by only a limited number of metals and alloys, and within limited temperature and strain rate ranges. For example, some titanium alloys, such as Ti-6Al-4V, have been observed to exhibit superplastic characteristics.

Until the advent of viable superplastic forming techniques, taking advantage of this property to form complex configurations requiring large tensile elongations was extremely difficult or, in some instances, not possible. Significant breakthroughs in superplastic forming were made by Hamilton, et al., which are disclosed in U.S. Pat. Nos. 3,934,441, Controlled Environment Superplastic Forming, and 4,181,000 Method For Superplastic Forming incorporated into this specification herewith by reference. Simplified, the process involves placing a metal blank workpiece over a cavity in a chamber. The workpiece is heated to a temperature where it exhibits superplastic characteristics after which differential pressure is applied to the workpiece, causing it to stretch and form into the cavity.

Diffusion bonding refers to the metallurgical joining of surfaces of similar or dissimilar metals by applying heat and pressure for a sufficient time so as to cause co-mingling of the atoms at the joint interface. Diffusion bonding is accomplished entirely in the solid state at or above one-half the base metal melting point. Actual times, temperatures and pressures will vary from metal to metal.

The combining of superplastic forming and diffusion bonding (SPF/DB) in the making of metallic sandwich structures has been successfully accomplished and is disclosed in U.S. Pat. No. 3,927,817, method of making metallic Sandwich Structures, by Hamilton, et al., also incorporated by reference.

Basically, the Hamilton, et al. method for making metallic sandwich structures involves fabricating the structures from a plurality of metal blank workpieces. One or more of the blanks are coated with stopoff in selected areas not to be diffusion bonded. The blanks are positioned in a stacked relationship and placed in a die assembly wherein the stack is clamped at its periphery forming a seal thereabout. The stack is diffusion bonded together in the uncoated areas by the application of pressure, and at least one of the blanks is superplastically formed against one or more of the die surfaces forming the sandwich structure. The core configuration is determined by the location, size and shape of the joined areas.

One of the problems with the Hamilton, et al. process is that there is no disclosure of a method of forming separate vertical webs or reinforcements. Such webs can have structural advantages. In some applications (regardless of strength requirements) vertical webs are a necessity, for example, in air ducts where the vertical webs act as guides for the air flowing therethrough. Another problem with the Hamilton, et al., process is that it is limited to metallic alloys having superplastic characteristics.

A prior art example of forming vertical webs in a sandwich structure is disclosed in U.S. Pat. No. 3,834,000, Method of Manufacturing a Multi-Webbed Expanded Steel Panel, by G. D. Miller. Miller's method involves forming a stack composed of a plurality of web bars between cover plates. The top and bottom surfaces of the bars are coated with a stopoff, excepting opposite edges, i.e., one end of the top surface and the opposite edge of the bottom surface. The assembly is roll diffusion bonded and expanded by pulling the cover plates apart (for example, by use of vacuum cups). The problem with this process is that in order to expand the stack the top cover must be pulled both upward and to the side. Thus, the stack could not be expanded within dies by means of internal pressure. This is particularly true if the stack is to be clamped at its periphery within the pair of dies.

Other methods of making sandwich structures with vertical webs typically require that the webs and cover sheets be fabricated separately. Joining of the two is, typically, accomplished by diffusion bonding, brazing, welding or mechanical fasteners. It is readily apparent that such methods are time consuming and, therefore, expensive.

Thus, it is a primary object of this invention to provide a method of making sandwich structures by selective joining and accordion expansion.

It is a further object of this invention to provide a method of making sandwich structures by a combination of diffusion bonding, accordion expansion, and superplastic forming.

It is a still further object of this invention to provide a method of making sandwich structures having vertical internal webs.

SUMMARY OF THE INVENTION

The invention is a method for making sandwich structures. A plurality of workpieces are provided having two principal opposes surfaces comprising first and second outer workpieces and at least two core workpieces, each having cutout portions defining at least one strip. An even number of core workpieces are required if vertical webs are to be formed. alternate longitudinal edges of superimposed strips are joined together and to the outer workpieces, preferably by diffusion bonding.

Diffusion bonding is accomplished by treating the outward facing surfaces of the core strips with a stopoff to prevent bonding thereof, longitudinal edge portion, while the inward facing surfaces of the core workpieces are treated in a similar fashion excepting the opposite edge longitudinal portion thereof. The workpieces are positioned in a stack contacting their principal surfaces and are preferably placed between shaping members such that at least one chamber in the shaping members is enclosed. The workpieces are heated to a temperature which is sufficient to produce diffusion bonding of the workpieces at the untreated portions of the workpieces after which compressive pressure sufficient to cause diffusion bonding is applied.

At least one outer workpiece is caused to expand, preferably into the at least one chamber such that it can form against the at least one shaping member. The expansion causes the plurality of stacked strips to extend vertically forming webs between first and second outer workpieces. Preferably an even number of core workpieces are used, so that vertical webs are produced. If an odd number are used, the webs are at an angle to the outer workpieces. Preferably, the at least one expanded outer workpiece has an effective strain rate sensitivity and the expansion is accomplished superplastically.

Additionally, the core workpieces may have an effective strain rate sensitivity and, after being extending vertically may also be further extended by superplastic forming.

The novel features which are believed to be characteristic of the invention, both as to its organization and its method of operation, together with further objects and advantages thereof, will be better understood from the following description in connection with the accompanying drawing in which a presently preferred embodiment of the invention is illustrated by way of example. It is to be expressly understood, however, that the drawings are for purposes of illustration and description only, and are not intended as a definition of the limits of the invention.

DESCRIPTION OF PREFERRED EMBODIMENT

Figure 1:
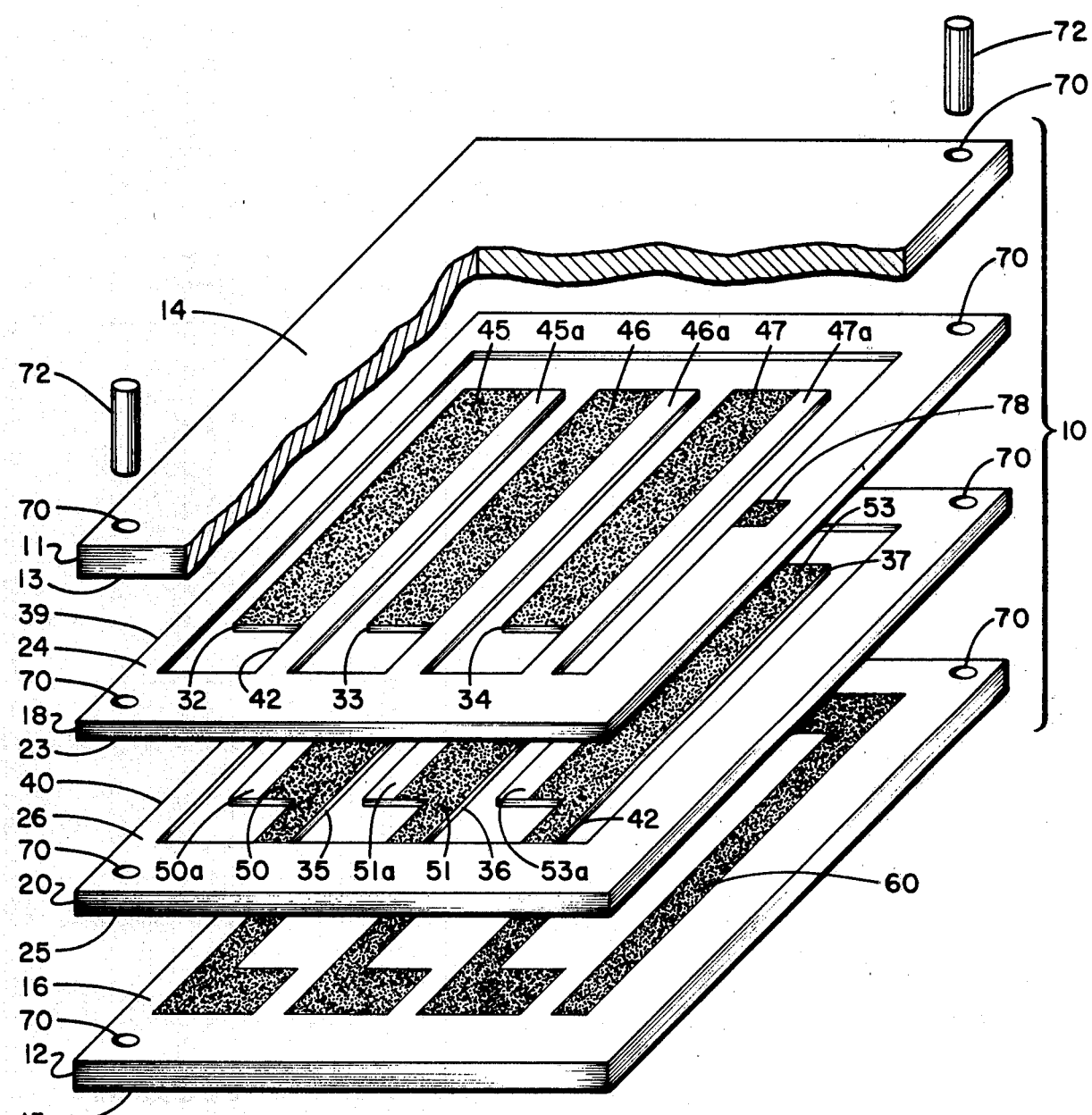
FIG. 1 illustrates an exploded perspective view of a four workpiece stack treated for selective diffusion bonding prior to insertion in a forming apparatus.
Figure 2:
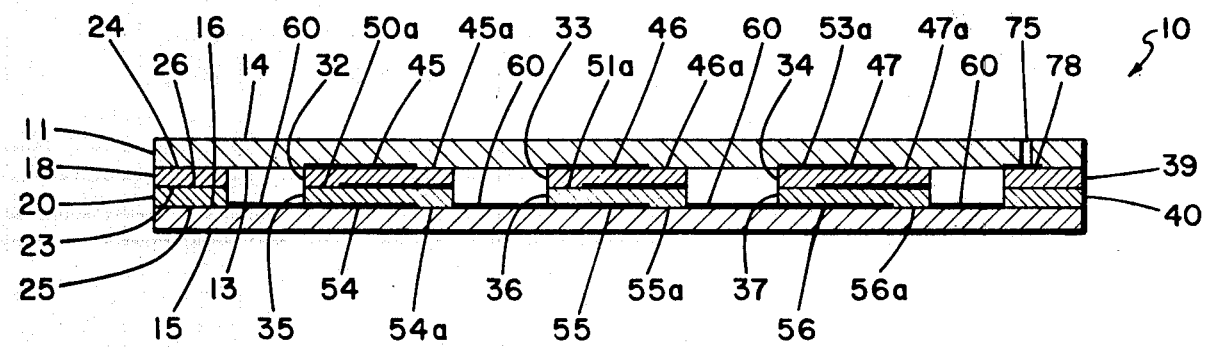
FIG. 2 illustrates a cross-sectional view of the workpieces stacked together.

Illustrated in FIG. 1 is an exploded perspective view of a four piece metal stack 10 which is to be formed into a sandwich structure according to the present invention. Illustrated in FIG. 2 is a cross-sectional view of the stack 10. The stack 10 is composed of outer workpieces, preferably in the form of sheets 11 and 12, having opposed principal surfaces 13 and 14, and 15 and 16, respectively. Sandwiched between the outer workpieces are core workpieces 18 and 20, preferably in the form of sheets, having opposed principal surfaces 23 and 24, and 25 and 26, respectively.

The core sheets 18 and 20 have been cut out to form two sets of strips 32, 33 and 34, and 35, 36, and 37, respectively, connected to frame portions 39 and 40, respectively, by tab portions 42. These cutouts in the core sheets can be accomplished by punching, conventional cutting techniques or chemical milling. By fabricating the core sheets 18 and 20 in this fashion, it is easier to properly position the core sheets in the stack 10. It must be noted that the core sheets could be fabricated separately, but controlling their placement in the stack and maintaining the desired position during subsequent forming operations would be difficult.

Additionally, the number of core sheets in each core sheet can vary depending upon the design requirements of the to be formed sandwich structure, but there must be at least one. Furthermore, if a vertical web is desired, the number of core workpieces must be an even number, i.e., the core sheets stacked on top of each other must be an even number for reasons which will be subsequently discussed.

Additionally, the workpieces must have the ability to be joined by such methods as brazing, welding, or bonding, preferably diffusion bonding. Preferably, at least one of the outer workpieces should exhibit superplastic properties. Any method that exhibits suitable superplastic properties within a workable temperature range can be used for such outer workpieces, but the present invention is particularly concerned with metals that exhibit superplastic properties within the temperature range required for diffusion bonding, preferably titanium, or any alloy thereof, such as Ti-6Al-4V. When using Ti-6Al-4V, the forming temperature is preferably approximately 1700° F. The core strips can also be made of a material that exhibits superplastic properties, but it is not a necessity. The theory and method of making sandwich structures by diffusion bonding and superplastic forming is disclosed in U.S. Pat. No. 3,927,817, Method For Making Metallic Sandwich Structures, by Hamilton et al. and is herewith incorporated by reference. Thus only a general description of the process need be provided herein.

In order to join at only selected areas of the workpieces, a preferred step is to apply a suitable stopoff material to those areas within the stack where no attachment or joining between the workpieces is desired. Thus, areas 45, 46, and 47 on surface 24 of core workpieces 18, areas 50, 51, and 53 of surface 26, of core workpiece 20 and areas 54, 55, and 56 of surface 25 of core workpiece 20 and finally, area 60 on surface 16 of workpiece 12 are coated. Area 60 is identical in size and shape to the cutouts in core workpieces 18 and 20. Typically, the stopoff material is Yttria ($Y_2O_3$) in a suitable binder applied, preferably by silk screening.

In order to insure that the stack remains aligned, the workpieces 11, 12, 18 and 20 are provided with alignment holes 70 at opposite corners in which can be inserted pins 72. In order to expand the stack 10 after diffusion bonding, workpiece 11 is provided with an aperture 75 extending from surface 14 to surface 13; and surface 24 of core workpiece 18 is treated at area 78 with a stopoff to prevent bonding at that location. Thus, when the workpieces are assembled into the stack 10 and bonded, a passageway to the interior of the stack 10 remains.

Figure 3:
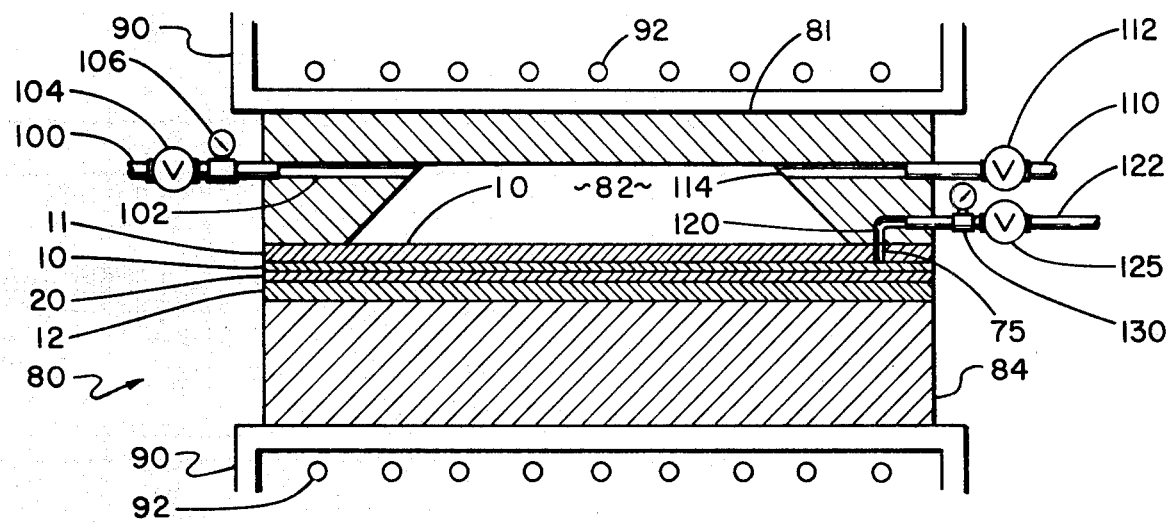
FIG. 3 illustrates the stack shown in FIG. 2 installed in a forming apparatus.
Figure 4:
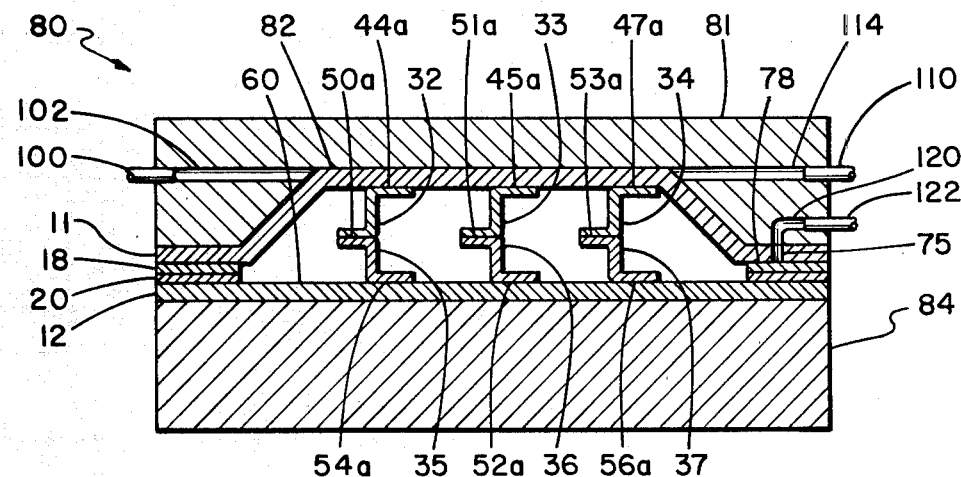
FIG. 4 illustrates the stack expanded into a sandwich structure within the forming apparatus shown in FIG. 3.

FIG. 3 illustrates a preferred forming apparatus generally indicated at 80 for carrying out the invention, while illustrated in FIG. 4 is the stack 10 expanded into a sandwich structure. Upper die 81 incorporates a chamber 82, while lower die 84, which preferably has the same outer area dimensions as upper die 81, can be flat so as to act as a base, as illustrated, for supporting the stack 10. For purposes of the claims, both the upper and lower dies 81 and 84, respectively, are to be considered shaping members as both combine to form the desired shaped sandwich structure. The stack 10, which is supported on the lower die 84, covers chamber 82.

When diffusion bonding, the unjoined stack 10 is preferably bonded after placement in the forming apparatus 80, thereby saving fabrication time and equipment costs (although the stack could be diffusion bonded, as by press bonding or roll bonding, before placing it in the forming apparatus 80). The weight of upper tooling frame 81 acts as a clamping means for the stack 10, and, thus, a single continuous edge of the stack 10 is effectively constrained between the upper and lower die 81 and 84. This insures that those portions of the workpieces of the stack 10 to be formed will be stretched rather than drawn. The frame portions 39 and 40 insure that the stack 10 remains essentially flat when clamped. Should it be desired, additional tightening means such as bolts (not shown) can be employed to more effectively constrain the stack 10. Another additional tightening means that could be employed is a press (not shown), preferably hydraulic, having platens 90.

Forming apparatus 80 is positioned between platens 90 and compressed, thereby assuring that stack 10 is effectively constrained and chamber 82 sealed from the ambient air. This arrangement is particularly advantageous as the platens 90 can be made of ceramic material and resistance heated wires 92 can be provided therein for heating stack 10 to the forming temperature. Other heating methods could be used with the forming apparatus 80 if the heating platens are not used.

For contamination prevention and diffusion bonding of the stack 10 when unjoined within the forming apparatus 80, an environmental control system is provided. The purpose of the system is to expose the stack 10 only to inert gas or vacuum while heating, forming, and bonding, and optionally, to diffusion bond the stack 10 by fluid pressure. Workpieces of the stack 10 will not react with inert gas due to the nature of the inert gas, even at the elevated forming and bonding temperatures. In a high vacuum, there are substantially no elements for the stack 10 to react with. Thus, in this environment, contamination of the stack 10 will be prevented.

Line 100 is connected to a source of pressurized inert gas at one end (not shown) and to chamber 82 through port 102 in upper die 81. A valve 104 for controlling the flow of inert gas through line 100 and into chamber 82 and a pressure gauge 106 to indicate pressure are provided. The inert gas used is preferably argon. Line 100 also functions as an outlet for inert gas in chamber 82 and could also be connected to a source of vacuum, such as a suction pump (not shown) for creating a vacuum in chamber 82. An additional line 110 incorporating valve 112 is optimally provided on the opposite side of upper die 81 and is coupled to chamber 82 via port 114 and is used in a manner similar to line 100.

The contamination prevention system can also function as a means for gas pressure diffusion bonding of stack 10. When stack 10 is placed in forming apparatus 80, as illustrated in FIG. 3, the stack 10 can be heated in an inert gas atmosphere to a suitable diffusion bonding temperature (approximately 1700° F. when the workpieces of stack 10 are Ti-6Al-4V) by heat generated from heating platens 90, and then applying pressure to stack 10 by increasing the pressure in chamber 82 by adding additional pressurized inert gas through line 100 while maintaining line 110 closed by valve 112. In this manner, the untreated areas of stack 10 will be diffusion bonded by the application of such pressure, which is, preferably, approximately 500 psi for Ti-6Al-4V. Suitable forming times, which depend on the thickness of stack 10, may vary from 30 minutes to 12 hours. The edges of the stack 10 in the area of frame portions 39 and 40 may also be diffusion bonded, if desired, by virtue of sealing pressure thereon in the form of the weight of upper tooling 44 and optionally pressure from a press and/or clamping means.

After diffusion bonding stack 10, excess inert gas would be removed from chamber 82 through lines 100 and 110 to allow for expansion of stack 10. Thus, untreated edge portions 45a, 46a, and 47a of core strip 32, 33 and 34, respectively, are bonded to surface 13 of outer workpiece 11 while untreated edge portions 54a, 55a, and 56a of core strips 35, 36, and 37 are bonded to surface 16 of outer workpiece 12. Additionally, the strips are bonded to each other at the untreated areas 50a, 51a, and 53a of core strips 35, 36, and 37. Thus, the stack has the appearance of a collapsed accordion-like structure having the core workpieces joined along alternate longitudinal edges to the outer workpieces and to the other core strips. When diffusion bonding, the outer workpiece 11 will be deflected inward into the unsupported cutout areas of the core assemblies 18 and 20. Thus, area 60 of surface 16 of outer workpiece 12 is coated with stopoff, in the manner previously discussed, to prevent the possibility of diffusion bonding therebetween.

Before expanding stack 10, the pressure in chamber 82 is reduced through lines 100 and 110. When stack 10 is joined prior to insertion in forming apparatus 80, the preceeding diffusion bonding step in forming apparatus 82 would be omitted. At superplastic forming temperature, which is approximately 1700° F. for Ti-6Al-4V alloy (generally 1650°–1750° F.), stack 10 is expanded by flowing pressurized inert gas through line 120 while, optimally, a vacuum is applied to chamber 82 through lines 100 and 110.

Still referring to FIG. 3 and FIG. 4, for expansion of stack 10, a port 120 is provided in upper die 81 which is coupled to aperture 75 in outer workpiece 11. Thus, the inert gas will flow into aperture 75 through stopoff path 78 into the cutout area 80. The port 120 is coupled via line 122 to a source of inert gas (not shown) and incorporates a valve 125 for governing the flow of inert gas therethrough, and a pressure gauge 130 for indicating pressure.

Such pressurized inert gas within stack 10 forces the expansion of stack 10 due to the pressure differential between the interior of stack 10 and chamber 82. The pressure differential normally used for superplastic forming of Ti-6Al-4V is normally in a range of from 25 to 250 psi. Workpiece 11 is initially lifted by the pressure differential and pulls with it the strip at the joined areas. Upon expansion, the core strips will unstack and bend about the diffusion bonded areas, and extend end-to-end to form a vertical web.

Thus, it can be seen that the core workpieces will not necessarily have to be made of a material that exhibits superplastic characteristics. But the core workpieces are usually of a material that exhibits superplastic characteristics so that some superplastic expansion (approximately 10%) can be performed ensuring that the core workpieces are truely vertical. Note that if an even number of core workpieces are provided, the untreated edges of the outward facing surfaces of the core strip are vertically aligned. Thus, upon expansion of the stack, a vertical web is formed. If the number of workpieces in a stack is odd, the web will not be vertical, but at an angle determined by the length of the core strips.

Figure 5:
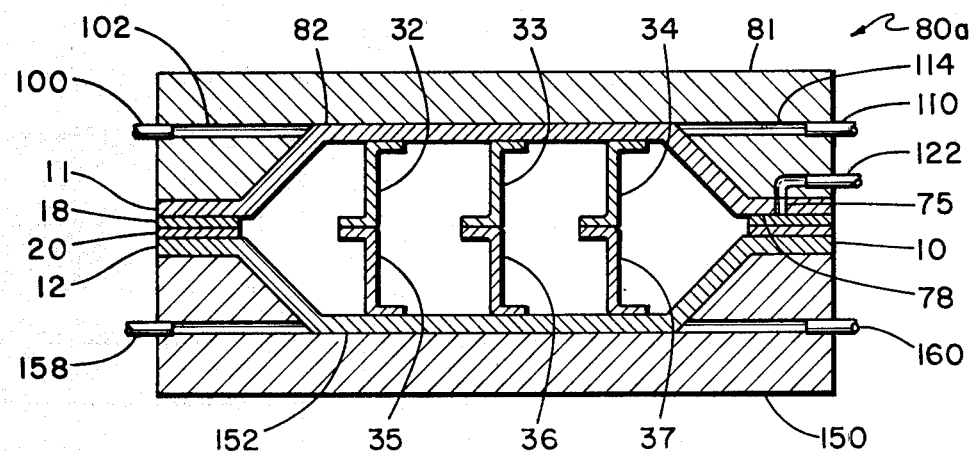
FIG. 5 illustrates a completed sandwich structure having both outer workpieces expanded within chambers of a forming apparatus.

FIG. 5 illustrates a forming frame 80a using upper die 81 and a differently configured lower die 150 having a chamber 152. Lines 158 and 160 are provided in lower die 150 for creating an inert gas environment in chamber 152 and to act as vents or vacuum lines when superplastically expanding stack 10, i.e., operate identically to lines 100 and 110. If stack 10 is diffusion bonded in forming apparatus 80a, the pressure in both chambers 82 and 152 would have to be increased, preferably equally, so that a suitable pressure is applied to stack 10 for diffusion bonding.

For superplastically expanding stack 10, the pressure within stack 10 would be increased by allowing flow of inert pressurized gas into stack 10 through aperture 75 via line 120 so that the pressure within stack 10 is greater than that in chambers 82 and 152. Additionally, the pressure in chambers 82 and 152 would have been reduced and, optimally, exposed to vacuum through lines 100, 110, 158 and 160, since both outer workpieces 11 and 12, typically, are to be superplastically expanded. Thus, in this case, each of the workpieces must be of a material with an effective strain rate sensitivity. As illustrated, workpiece 11 is forced upwards into chamber 82 while workpiece 12 is forced downward into chamber 152, and the core strips, by virtue of being selectively joined at specified locations to both workpieces 11 and 12 and to each other, are deformed in both directions and form vertical webs, as shown.

While the embodiment illustrated is directly primarily at a method of making metallic sandwich structures, and particularly by superplastic forming of metals having an effective strain rate sensitivity, this should not be construed as a necessary limitation. The method could be applied to making sandwich structures from metals such as aluminum which generally do not have an effective strain rate sensitivity, plastics, or composites.

Having thus described the invention, it is obvious that numerous modifications and departures may be made by those skilled in the art; thus, the invention is to be construed as being limited only by the spirit and scope of the appended claims.

What is claimed is:

1. A method of making sandwich structures from a plurality of workpieces comprising:
   providing at least four workpieces, each of said workpieces having two opposed principal surfaces, at least two of said workpieces being core workpieces, said core workpieces being substantially identical, said core workpieces having portions thereof cutout such that a plurality of parallel strips and a frame portion are defined, said strips being surrounded by said frame portion, said strips being spaced from each other by said cutout portions, said strips being connected to said frame portion, said strips having two longitudinal edges and two lateral edges;
   treating selected areas of said workpieces to inhibit joining at said areas;
   positioning said workpieces in a stack contacting at their principal surfaces such that there are two outer workpieces which sandwich said core workpieces, said core workpieces being positioned such that said strips are in aligned rows;
   joining said stack of workpieces at the untreated areas with said strips being joined in respective rows and to the outer sheets along alternate longitudinal edges; and
   expanding the joined stack such that said strips form substantially vertically at the treated areas thereof.

2. The method of claim 1 wherein each of said strips has an untreated longitudinal band on each principal surface, said untreated band being adjacent one longitudinal edge on one principal surface and adjacent to the other longitudinal edge on the opposite principal surface, and said positioning step is performed such that said untreated bands are in contacting alignment on contacting principal surfaces of said strips and in spaced alignment on the principal surfaces of said strips contacting said outer workpieces.

3. The method of claim 2 wherein said joining is by diffusion bonding.

4. The method of claim 2 or 3 wherein at least one outer workpiece is of a metal having superplastic characteristics and said at least one outer workpiece is expanded by superplastic forming during said expanding step.

5. The method of claim 4 wherein both outer workpieces have superplastic characteristics and are expanded by superplastic forming during said expanding step.

6. The method of claim 4 also including the steps of:
   providing at least two shaping members; and
   enclosing at least one chamber by positioning said stack of workpieces relative to said shaping members, said at least one outer workpiece being superplastically expanded during said expanding step into said at least one chamber and formed against one of said shaping members.

7. The method of claim 6 wherein said stack is expanded by applying a differential pressure between the interior of said stack and said at least one chamber.

8. The method of claim 7 wherein said workpieces have substantially the same outer shape and are positioned evenly in said stack.

9. The method of claim 7 wherein said core workpieces have two longitudinal edges and two lateral edges, and said strips are positioned such that the longitudinal edges thereof are substantially parallel to or at right angles to said longitudinal edges of said core workpieces.

10. The method of claim 2 or 3 also including the step of heating said stack to within an elevated temperature range, and wherein said expanding step is performed while said stack is within said temperature range.

11. The method of claim 4 wherein said core workpieces have superplastic characteristics, and during said expansion step said strips are initially formed vertically by unfolding and subsequently extended by superplastic forming.

* * * * *